United States Patent Office 2,921,051
Patented Jan. 12, 1960

2,921,051
POLYESTER FILM AND PROCESS THEREFOR

Leonard Edward Amborski, Buffalo, Emmette Farr Izard, Kenmore, and Cyrus Efrem Sroog, Grand Island, N.Y., assignors to E. I. du Pont de Nemours and Company, Wilmington, Del., a corporation of Delaware No Drawing. Application September 30, 1953
Serial No. 383,372

9 Claims. (Cl. 260—75)

This invention relates to a process of preparing highly polymeric linear terephthalic ester film having improved electrical properties for use as a dielectric material and, more particularly, to the process of preparing polyethylene terephthalate film having improved electrical insulation resistance.

The production of the novel class of film- and fiber-forming linear polyesters of terephthalic acid and a glycol of the series $HO(CH_2)_nOH$ where "$n$" is an integer from 2 to 10 inclusive is fully disclosed in United States Patent No. 2,465,319 to Whinfield and Dickson. From a commercial standpoint, one of the most attractive polymers of this class is polyethylene terephthalate; and the most promising process for its production comprises carrying out an ester interchange between ethylene glycol and dimethyl terephthalate to form bis-2-hydroxyethyl terephthalate monomer which is polymerized to polyethylene terephthalate under reduced pressure and at elevated temperatures.

Polyethylene terephthalate film, particularly film which has been stretched substantially the same amount, e.g., three times (3×) in both directions and heat-set at an elevated temperature, e.g., 200° C., has been found to possess a unique combination of electrical, physical and chemical properties which make it outstanding for use as a dielectric. Furthermore, the outstanding electrical properties, strength, and durability of polyethylene terephthalate film are substantially retained at elevated temperatures to the extent that the film is particularly outstanding for use as a dielectric in capacitors, motors, generators, transformers and other electrical conductors which are required to operate efficiently at ambient temperatures approaching 150°–175° C.

In evaluating the adaptability of various candidate dielectric materials, one of the most important electrical properties to be considered is that of the insulation resistance of the dielectric. In more specific terms, the insulation resistance of a dielectric is the resistivity of the material, that is, the resistance the dielectric offers to the flow of current therein. For use in high impedance (the resistance in a circuit to the flow of current) circuits, a dielectric in capacitors, for example, should have a resistance at least equal to or greater than the impedance in order to operate without breakdown for long durations, particularly at elevated temperatures.

In the case of biaxially stretched, heat-set, polyethylene terephthalate film, it was found to have an insulation resistance which permitted efficient operation as a dielectric at elevated temperatures for only limited periods. All other properties, that is, physical, chemical and the remaining electrical properties, remain substantially intact. Hence, in order to permit the use of polyethylene terephthalate film in a greater variety of commercial electrical applications, it was necessary to find some method of increasing the electrical insulation resistance of the material.

It is an object of the present invention to provide a process of preparing polyethylene terephthalate film having improved electrical insulation resistance. It is a further object to prepare polyethylene terephthalate film particularly useful as a dielectric in capacitors. Other objects will be apparent from the description of the invention given hereinafter.

The above objects are accomplished in accordance with the present invention which, briefly stated, comprises preparing polyethylene terephthalate in the presence of a catalyst system comprising catalytic amounts of (1) an alkaline metal from the group consisting of lithium, sodium, calcium, and magnesium, and their hydrides, hydroxides, alcoholates, chlorides, and glycol-soluble salts of monocarboxylic acids; (2) a glycol-soluble salt of a monocarboxylic acid and a metal from the group consisting of zinc and cadmium; (3) an antimony compound from the group consisting of antimony trioxide, antimonyl potassium tartrate, antimonous oxychloride, antimony trifluoride, and sodium antimonyl hydroxy acetate; and (4) a phosphorus compound from the group consisting of alkyl, phenyl, alkyl phenyl and hydroxy alkyl phosphite and phosphate esters, phosphorous acid and phosphoric acid; and forming a film from the resulting polymer.

Representative specific compounds falling within the group labeled (1) include lithium metal, sodium metal, lithium hydride, lithium hydroxide, lithium glycolate (prepared by reacting a lithium hydride or lithium hydroxide with ethylene glycol), calcium hydride and magnesium acetate. The concentration of such compounds in the reaction mixture should, in general, fall within the range of from 0.003% to 0.010%, based on the weight of dialkyl terephthalate employed in the initial ester interchange reaction.

As examples of specific salts of glycol-soluble monocarboxylic acids and a metal from the group consisting of zinc and cadmium, there may be mentioned zinc acetate, zinc lactate, zinc salicylate, and cadmium acetate and cadmium salicylate. Glycol-soluble zinc and cadmium salts of higher monocarboxylic acids, including those containing up to 18 carbon atoms, e.g., propionic, butyric, valeric, stearic, lauric, are entirely satisfactory. These salts, as well as the antimony compounds, should be used in concentrations within the range of from 0.02% to 0.05%, based on the weight of dialkyl terephthalate.

The term "glycol-soluble," employed herein to define the organic salts of the metals enumerated above, applies to those salts which are soluble in ethylene glycol, in catalytic quantities, that is, up to about 0.1% based upon the weight of the dialkyl terephthalate, i.e., dimethyl terephthalate. Many of the salts defined herein are soluble in cold, i.e., room temperature, glycol; but the term "glycol-soluble" is meant to include solubility in hot glycol, i.e., temperatures up to 140°–150° C. These soluble salts are known generally as homogeneous catalysts because their solubility in the glycol provides for a homogeneous system as contrasted to a heterogeneous system which is not soluble and thereby forms a heterogeneous system.

The phosphorus compounds which may be employed in the practice of the present invention include alkyl, phenyl and alkyl phenyl phosphite and phosphate esters, phosphorous and phosphoric acids. This general group of phosphorus compounds includes the following specific compounds: triphenyl phosphite, tricresyl phosphite, tributyl phosphite, dibutyl phenyl phosphite, phenyl ethyl phosphite, trimethyl phosphite, triethyl phosphite, trioctyl phosphite, tricresyl phosphate, triethyl phosphate, tributyl phosphate, triphenyl phosphate, triamyl phosphate, diphenyl ethyl phosphate, diphenyl phosphate, tri-2-hydroxyethyl phosphate, ortho-, pyro-, meta-, and hypophosphoric acids and phosphorous acids. Mixtures of any of these phosphorus compounds may be used. Preferably, the molar quantity of the phosphorus compound should be at least 0.7 and may be as much as 2 times the molar quantity of the remaining components in the catalyst system. Although the phosphorus compound may be added to the ester interchange reaction, it is preferred to add the phosphorus compound to the system just prior to polymerization of the bis-2-hydroxyethyl terephthalate resulting from the ester interchange reaction. Furthermore, the phosphorus compound may be added during the early stages of polymerization so long as the polymer is not too viscous and sufficient time is permitted for mixing with the molten polymer at elevated temperatures.

In processes where it is desirable to recover ethylene glycol, which is given off as a by-product of the polymerization of bis-2-hydroxyethyl, it is desirable not to employ aromatic phosphorus compounds which lead to the formation of further by-products which are not easily removed from ethylene glycol. For example, when tricresyl phosphate is added to the bis-2-hydroxyethyl terephthalate, mixed isomeric cresols are formed during the ensuing reaction, and these cresols accumulate in the by-product glycol. The cresols, having boiling points close to that of ethylene glycol, cannot be conveniently removed from the glycol by simple distillation. On the other hand, it has been found that if a lower boiling alkyl phosphate, for example, is added to the bis-2-hydroxyethyl terephthalate, the phosphate is practically entirely lost from the reaction because it distills away and out of the polymerizing mixture (under the high vacuum reaction conditions). This situation may be remedied by reacting, as a preliminary to adding the phosphorus compound to the bis-2-hydroxyethyl terephthalate, the alkyl phosphate, for example, tributyl phosphate, with ethylene glycol in the presence of catalytic amounts of lithium hydride (0.005 mol lithium hydride to 0.215 mol tributyl phosphate) to form a reaction mixture containing tri-2-hydroxyethyl phosphate and butyl alcohol. The butyl alcohol distills off, and the resulting hydroxyalkyl phosphate may be added directly to the bis-2-hydroxyethyl terephthalate.

The following examples will serve to further illustrate the practice and principles of the present invention.

In electrical applications in general, as mentioned hereinbefore, the insulating material or dielectric is subjected to electrical stresses which result in current flow in the dielectric. The current flow increases as a result of decreasing resistivity at elevated temperatures. In the case of capacitors, this effect is particularly important because the flow of current results in higher temperatures and shorter life. The resistivity of the polyethylene terephthalate film dielectric is measured by constructing a capacitor, using the film as the dielectric, and connecting a capacitor into a high resistance bridge circuit (General Radio Megohm Bridge, Type 544–B). Two types of capacitors are used. In the first, a wound capacitor is assembled and the dielectric is evaluated in terms of meghoms×microfarads. In the second method, a single sheet of test dielectric is used, and the resistance value measured in ohms is used to calculate volume resistivity (across opposite faces of a unit cube) in terms of ohm-centimeters. The wound capacitor consists of alternate single layers of polyethylene terephthalate film (2" in width) and aluminum foil (1½" in width). The length of film wound into the capacitor is determined by the desired capacitance. The resistance of the wound capacitor is measured at 130° C. on a megohm bridge and then the capacitance is measured under the same conditions using a Cornell-Dubilier capacitor analyzer. The product of the two values gives a megohms×microfarads value. The single sheet measurement is made by painting a round electrode (2" in diameter) on each side of the specimen of known thickness. The specimen is placed between brass plates of the electrode cell which is connected to the megohm bridge. The resistance in ohms at 170° C. is used to calculate resistivity, $r$, in ohm-centimeters from the following relationship:

$$r = \frac{R \times A}{t}$$

where:

$R$=resistance in ohms at 170° C.;
$A$=area in square centimeters;
$t$=thickness in centimeters.

The data on insulation resistance tabulated in Table I below were obtained from testing film extruded from polymer prepared as follows: Glycol and dimethyl terephthalate were introduced into a batch reactor, e.g., an autoclave fitted with stirring means; and the ester interchange reaction was carried out at atmospheric pressure and within a temperature range between 140°–220° C.; and methanol was continuously withdrawn from the reactor. At the end of the ester interchange step, polymerization of bis-2-hydroxyethyl terephthalate was carried out within a temperature range between 230°–290° C. under reduced pressure within the range from 0.05–2.5 millimeters of mercury. During polymerization, glycol was continuously withdrawn from the reactor. Generally the phosphorus compound was injected into the reactor after completion of the ester interchange reaction. However, if desired, the phosphorus compound may be added to the reactor along with initial reactants and catalyst system. The polymerization reaction was carried out until the desired intrinsic viscosity was attained, i.e., within the range from 0.55–0.65. Thereafter, the polymer was introduced into an extrusion apparatus from which the polymer was continuously extruded into film in amorphous form. This film was then continuously stretched longitudinally and then transversely to the same extent, that is, three times (3×) in each direction to form a balanced film and heat-set at 200° C. while held under tension. The thicknesses of the resulting biaxially stretched balanced film are indicated in Table I. It should be pointed out that the insulation resistance of films having a thickness less than about 0.001" (1 mil) is less than that of films having greater thickness, that is, when comparing films extruded from polymer prepared in the presence of exactly the same catalyst system and phosphorus compound and the same concentrations of these materials. It should be emphasized, however, that the insulation resistance of films having a thickness of 1 mil or greater, e.g., 1–2½ mils, may be compared directly.

In Table I, the quantities of the compounds making up the catalyst system and the quantities of phosphorus compound are expressed in terms of percentages based upon the weight of dimethyl terephthalate charged to the reactor. However, the molecular weight of dimethyl terephthalate is substantially the same as the molecular weight of a unit of polymer; hence, the percentages of catalysts and the phosphorus compounds are also substantially equivalent to percent by weight of the resulting polymer.

With respect to Example 11, a product resulting from reacting tributyl phosphate and ethylene glycol in the presence of lithium hydride, 0.0005% lithium hydride, based upon the weight of dimethyl terephthalate of the ester interchange reaction, was added to the reaction vessel after the ester interchange step. The amount of tributyl phosphate was 0.36%, based upon the weight of dimethyl terephthalate. In other words, the product of reacting tributyl phosphate and glycol is equivalent to 0.36% tributyl phosphate, based upon the weight of dimethyl terephthalate.

Table I

| Example | Catalyst Combination [1] | Additive and Quantity [1] | Mols of Phosphorus Compound/ Total Mols of Catalyst | Insulation Resistance (ohm cm.) at 170° C. | Thickness (mils) |
|---|---|---|---|---|---|
| 1 | 0.005 LiH (lithium hydride)<br>0.035 Zn(OAc)₂ (zinc acetate)[2]<br>0.03 Sb₂O₃ | | 0 | 3.2×10¹¹ | 1.0 |
| 2 | 0.005 LiH<br>0.035 Zn(OAc)₂<br>0.03 Sb₂O₃ | 0.3 Triphenyl phosphite | 1.03 | 1.6×10¹³ | 0.7 |
| 3 | 0.005 LiH<br>0.035 Zn(OAc)₂<br>0.03 Sb₂O₃ | 0.5 Triphenyl phosphite | 1.75 | 4.8×10¹³ | 1.6 |
| 4 | 0.005 LiH<br>0.035 Zn(OAc)₂<br>0.03 Sb₂O₃ | 0.345 Tricresyl phosphite | 1.06 | 2.0×10¹³ | 2.0 |
| 5 | 0.005 LiH<br>0.035 Zn(OAc)₂<br>0.03 Sb₂O₃ | 0.33 Triphenyl phosphate | 1.10 | 1.8×10¹³ | 2.8 |
| 6 | 0.005 LiH<br>0.035 Zn(OAc)₂<br>0.03 Sb₂O₃ | 0.348 Tricresyl phosphate | 1.03 | 1.6×10¹³ | 1.75 |
| 7 | 0.005 LiH<br>0.035 Zn(OAc)₂<br>0.03 Sb₂O₃ | 0.58 Tricresyl phosphate | 1.72 | 3.6×10¹³ | 1.0 |
| 8 | 0.005 LiH<br>0.035 Zn(OAc)₂<br>0.03 Sb₂O₃ | 0.42 Tributyl phosphate | 1.72 | 2.3×10¹³ | 1.04 |
| 9 | 0.005 LiH<br>0.035 Zn(OAc)₂<br>0.03 Sb₂O₃ | 0.63 Tributyl phosphate | 2.58 | 2.3×10¹³ | 0.70 |
| 10 | 0.006 LiH<br>0.035 Zn(OAc)₂<br>0.03 Sb₂O₃ | 0.11 orthophosphoric acid | 1.07 | 3.6×10¹³ | 0.85 |
| 11 | 0.008 LiH<br>0.035 Zn(OAc)₂<br>0.03 Sb₂O₃ | Equivalent to 0.36 tributyl phosphate. | 1.04 | 1.5×10¹³ | 1.0 |
| 12 | 0.04 Mg(OAc)₂ (magnesium acetate)[3]<br>0.035 Zn(OAc)₂<br>0.03 Sb₂O₃ | 0.20 Triphenyl phosphite | 1.12 | 1.6×10¹³ | 1.0 |

[1] Weight percent dimethyl terephthalate.
[2] Zinc acetate dihydrate.
[3] Magnesium acetate dihydrate.

In Table II below, the data on resistance and capacitance were collected on the basis of measurements made on film extruded from polymer prepared by a continuous process as follows: Glycol and dimethyl terephthalate were continuously fed into the top of an ester interchange reaction column and methanol was continuously removed from the top of the column; and bis-2-hydroxyethyl terephthalate was withdrawn from the bottom of the column. The ester interchange and polymerization catalysts were fed to the column with the reactants, that is, glycol and dimethyl terephthalate. Generally, the phosphorus compound, triphenyl phosphite (TPP), was injected into the liquid product of ester interchange; but, if desired, the phosphorus compound may be added along with the ester interchange and polymerization catalyst. The bis-2-hydroxyethyl terephthalate was continuously fed into a "prepolymerization column" wherein glycol was continuously evolved from the extreme top of the column and a prepolymer of polyethylene terephthalate was removed near the top of the column. The prepolymer was then continuously fed into a mixer-type of reactor which effected more complete polymerization to produce polymer of the desired intrinsic viscosity. Thereafter, the polymer was continuously extruded into film in amorphous form; and this film was continuously stretched longitudinally and then transversely to the same extent three times (3×) in each direction and heat-set at 200° C. while held under tension. The thickness of the resulting biaxially stretched film was 0.25 mil. The intrinsic viscosity, denoted by the symbol $n_0$, is used herein as a measure of degree of polymerization of the polyester and may be defined as $$\frac{\text{Limit ln } (n_r)}{C} \text{ as C approaches 0}$$

wherein $n_r$ is the viscosity of a dilute phenol-tetrachloroethane (60–40) solution of the polyester divided by the viscosity of the phenol-tetrachloroethane mixture per se measured in the same units at the same temperature, and C is the concentration in grams of polyester per 100 cc. of solution.

Table II

| Example | Catalyst, Percent [1] | Triphenyl Phosphite [1] (Percent) | Mols of Phosphorus Compound/ Total Mols of Catalyst | Resistance (megohms) | Capacitance (Microfarads) | Megohms× microfarads Value at 130° C. |
|---|---|---|---|---|---|---|
| 13 | 0.006 LiH<br>0.035 Zn(OAc)₂<br>0.03 Sb₂O₃ | | 0 | 100 | 0.50 | 50 |
| 14 | 0.006 LiH<br>0.035 Zn(OAc)₂<br>0.03 Sb₂O₃ | 0.1 | 0.31 | 114 | 0.44 | 50 |
| 15 | 0.006 LiH<br>0.035 Zn(OAc)₂<br>0.03 Sb₂O₃ | 0.5 | 1.55 | 1140 | 0.44 | 500 |

Table III contains data obtained by measuring the resistivity of a single sheet of film (stretched 3× in both directions and heat-set at 200° C.). The film was extruded from polymer prepared in the continuous process described above.

*Table III*

| Example | Catalyst [1] | Additive and Quantity [1] | Mols of Phosphorus Compound/ Total Mols | Insulation Resistance, ohm-cm. at 170° C. | Thickness (mils) |
|---|---|---|---|---|---|
| 16 | 0.008 LiH<br>0.035 Zn(OAc)$_2$<br>0.03 Sb$_2$O$_3$ | 0.5 Tricresyl Phosphate | 1.07 | 2×10$^{13}$ | 1.0 |
| 17 | 0.008 LiH<br>0.035 Zn (OAc)$_2$<br>0.03 Sb$_2$O$_3$ | Reaction product of tributyl phosphate and glycol (Equivalent to 0.36% tributyl phosphate). | 1.04 | 1.5×10$^{13}$ | 1.0 |

[1] Weight percent of dimethyl terephthalate.

The data on insulation resistance presented in Table IV were obtained from measurements made on film extruded from polymer prepared in accordance with the batch process described hereinbefore. In all cases, the catalyst system consisted of 0.006% lithium hydride, 0.035% zincacetate, and 0.03% antimony trioxide. Tricresyl phosphate (TCP-0) was the phosphorous compound employed. The data in this table specifically illustrate the increase in insulation resistance of the film when greater quantities of the phosphorus compound are added. In most cases, that is, when employing a particular phosphorus compound within the scope of the present invention, the mol ratio of phosphorus compound to mols of total catalyst, i.e., ester interchange and polymerization, should be at least 0.7 to obtain improvement in insulation resistance of film to sufficiently high levels for use as a dielectric in applications where high insulation resistance is required. Usually, a mol ratio of phosphorus compound to total catalyst approaching one is employed, and mol ratios substantially greater than 1.5–2 are not necessary.

*Table IV*

| Example | Percent TCP-0[1] | Mol Ratio TCP-0/Total Catalyst | Insulation Resistance (ohm. cm.) at 170° C. | Thickness (mils) |
|---|---|---|---|---|
| 18 | 0.337 | 0.9 | 2.00 × 10$^{13}$ | 1.47 |
| 19 | 0.300 | 0.8 | 1.59 × 10$^{13}$ | 1.50 |
| 20 | 0.263 | 0.7 | 1.76 × 10$^{13}$ | 2.03 |
| 21 | 0.225 | 0.6 | 5.21 × 10$^{13}$ | 1.61 |
| 22 | 0.187 | 0.5 | 2.96 × 10$^{13}$ | 1.05 |
| 23 | 0.168 | 0.45 | 6.74 × 10$^{13}$ | 1.45 |
| 24 | 0.150 | 0.40 | 1.64 × 10$^{13}$ | 1.81 |
| 25 | 0.132 | 0.35 | 2.66 × 10$^{12}$ | 1.47 |
| 26 | | | 3.2 × 10$^{11}$ | 1.00 |

[1] Weight percent of polymer.

Although the process and advantages of the present invention have been particularly described with the respect to the preparation of polyethylene terephthalate, it should be understood that the purview of the present invention is meant to include modified polyethylene terephthalates, i.e., modified with small quantities, e.g., up to 20% of other dicarboxylic acids. For example, glycol, terephthalic acid, or a dialkyl ester thereof, and a second acid or ester thereof, may be reacted together to form a copolyester, the second acid being selected from the group consisting of isophthalic acid, bibenzoic acid, hexahydro terephthalic acid, adipic acid, sebacic acid, azelaic acid, the naphthalic acids, 2,5-dimethyl terephthalic acid, and bis-p-carboxyphenoxyethane.

It is also within the scope of the present invention to prepare polyesters by reacting other glycols besides ethylene glycol, such glycols being selected from the series HO(CH$_2$)$_n$OH where "$n$" is an integer from 2 to 10 inclusive. And, in place of dimethyl terephthalate, there may be employed as monomer any of the terephthalic esters of saturated aliphatic monohydric alcohols containing up to and including 7 carbon atoms.

It should be emphasized that polyethylene terephthalate film, prepared in accordance with the present invention, is most useful as a dielectric when it has been oriented, e.g., stretched and/or rolled, in both directions to form a balanced film, i.e., has substantially the same physical properties as measured in both directions. The oriented film is heat-set between 150°–250° C. while maintained under tension. When forming a balanced film by stretching in both directions, the best film is that stretched to the same extent in both directions between 2.5 times (×) to 3.25×.

In film form, polyethylene terephthalate may be used in a large variety of applications; and, owing to the outstanding strength and toughness of the film, it can be used in calipers as low as 0.00025" (0.25 mil). On the other hand, the films are transparent and of high clarity in calipers up to 0.005"–0.010". Polyethylene terephthalate film having a high insulation resistance as produced in accordance with the process of this invention may be employed in a great variety of electrical applications, that is, as a dielectric, for example, as a dielectric in capacitors, as slot insulation for motors, primary insulation for heat-resistant wire, pressure-sensitive electrical tape, split mica insulating tape, i.e., mica sheet laminated between film, small condensers, metal foil laminated to film or film having an adherent metal coating, weather resistant electrical wire, i.e., a conductor wrapped with film coated with asphalt, as a wrapping for submerged pipe to insulate against ground currents, as primary and secondary insulation in transformer construction, as a dielectric in electroluminescent structures, etc.

We claim:

1. In the process of manufacture of highly polymeric linear terephthalic ester film to be used as dielectric material, wherein an alkyl ester of terephthalic acid having 1–7 carbon atoms in the alkyl group is reacted under ester interchange conditions with a polymethylene glycol having from 2–10 carbon atoms, the resulting glycol terephthalate is polymerized in the presence of an ester interchange-polymerization catalyst system to form the linear polyester, and film is formed from said polyester, the improvement which comprises employing as the catalyst a system (1) from 0.003% to 0.01% by weight, based on the weight of alkyl ester of terephthalic acid, of an alkaline metal-containing material from the group consisting of lithium, sodium, calcium, and magnesium, and their hydrides, hydroxides, alcoholates, chlorides, and glycol soluble salts of monocarboxylic acids; (2) from 0.02% to 0.05% by weight, based on the weight of alkyl ester of terephthalic acid, of a glycol-soluble salt of a monocarboxylic acid and a metal from the group consisting of zinc and cadmium; (3) from 0.02% to 0.05% by weight, based on the weight of alkyl ester of terephthalic acid, of an antimony compound from the group consisting of antimony trioxide, antimonyl potassium tartrate, antimonous oxychloride, antimony trifluoride, and sodium antimonyl hydroxy acetate; and (4) a phosphorus compound from the group consisting of alkyl, phenyl, hydroxy alkyl and alkyl phenyl phosphite esters, alkyl, phenyl, hydroxyalkyl and alkyl phenol phosphate esters, phosphorous and phosphoric acids, said phosphorus compound being present in a molar quantity of from 0.7 to 2 times the molar quantity of the remaining components of said catalyst system.

2. A film of highly polymeric linear terephthalic ester prepared in accordance with the process of claim 1.

3. A biaxially oriented balanced, heat-set film of highly polymeric linear terephthalic ester prepared in accordance with the process of claim 1.

4. The process of claim 1 wherein the alkyl ester of terephthalic acid is dimethyl terephthalate and said glycol is ethylene glycol.

5. A film of polyethylene terephthalate prepared in accordance with the process of claim 4.

6. A biaxially oriented balanced, heat-set film of highly polymeric linear terephthalic ester prepared in accordance with the process of claim 4.

7. The process of claim 1 wherein said phosphorus compound is introduced into the catalytic system after the ester interchange reaction and before the polymerization reaction is completed.

8. The process of claim 1 wherein said phosphorus compound is introduced into the catalytic system after the ester interchange reaction and before the polymerization reaction is completed.

9. The process of claim 1 wherein said alkaline metal-containing material is lithium hydride, said glycol-soluble salt of a monocarboxylic acid is zinc acetate, and said antimony compound is antimony trioxide.

References Cited in the file of this patent

UNITED STATES PATENTS

| | | |
|---|---|---|
| 2,647,885 | Billica | Aug. 4, 1953 |
| 2,650,213 | Hofrichter | Aug. 25, 1953 |
| 2,681,360 | Vodonik | June 15, 1954 |

UNITED STATES PATENT OFFICE

CERTIFICATE OF CORRECTION

Patent No. 2,921,051                      January 12, 1960

Leonard Edward Amborski et al.

It is hereby certified that error appears in the printed specification of the above numbered patent requiring correction and that the said Letters Patent should read as corrected below.

Columns 7 and 8, Table III, heading to column 4 thereof, for "Mols of Phosphorus Compound/Total Mols" read -- Mols of Phosphorus Compound/Total Mols of Catalyst --; column 7, Table IV, column 4 thereof, Example 21, for "5.21 X $10^{13}$" read -- 5.21 X $10^{12}$ --; Example 22, for "2.96 X $10^{13}$" read -- 2.96 X $10^{12}$ --; Example 23, for "6.74 X $10^{13}$" read -- 6.74 X $10^{12}$ --; Example 24, for "1.64 X $10^{13}$" read -- 1.64 X $10^{12}$ --.

Signed and sealed this 14th day of June 1960.

(SEAL)
Attest:

KARL H. AXLINE
Attesting Officer

ROBERT C. WATSON
Commissioner of Patents